June 9, 1964     L. LOCHER ETAL     3,136,582
TOOLS FOR THE MANUFACTURE OF BRUSH WARE
Filed May 12, 1958     5 Sheets-Sheet 4

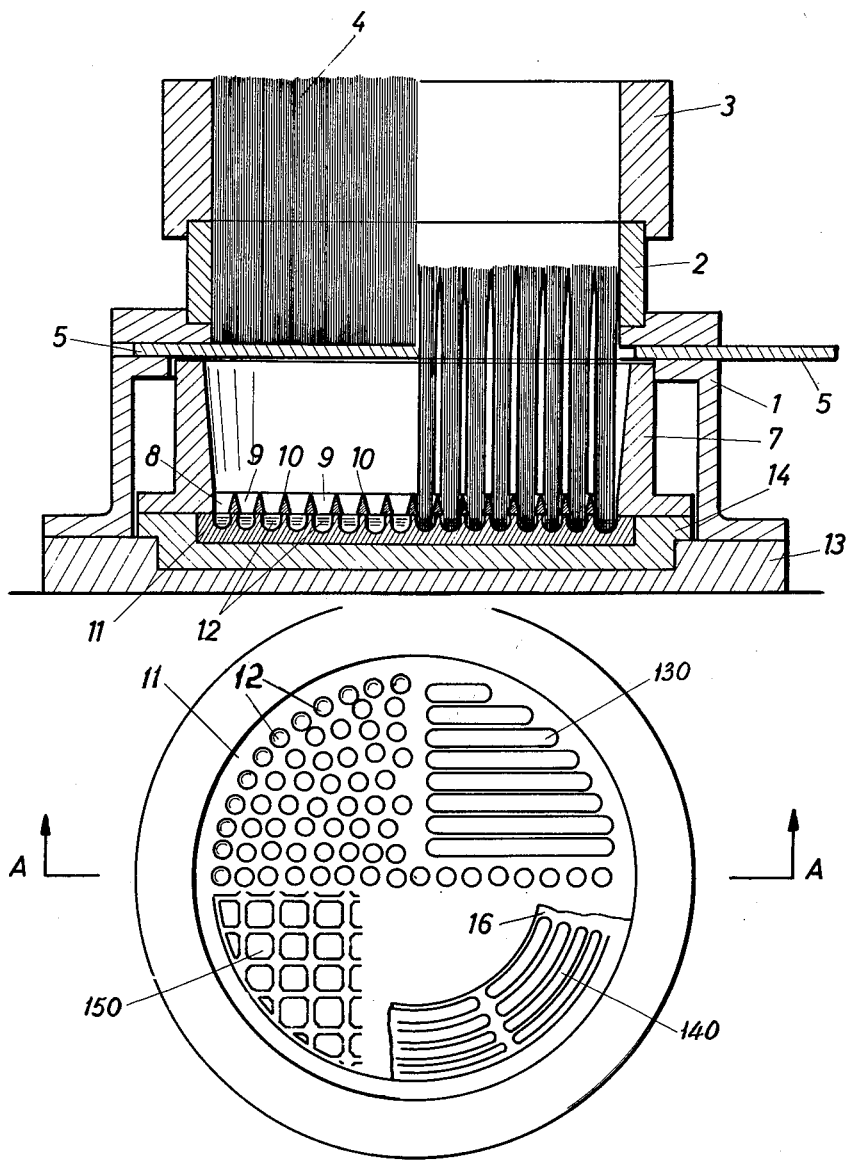

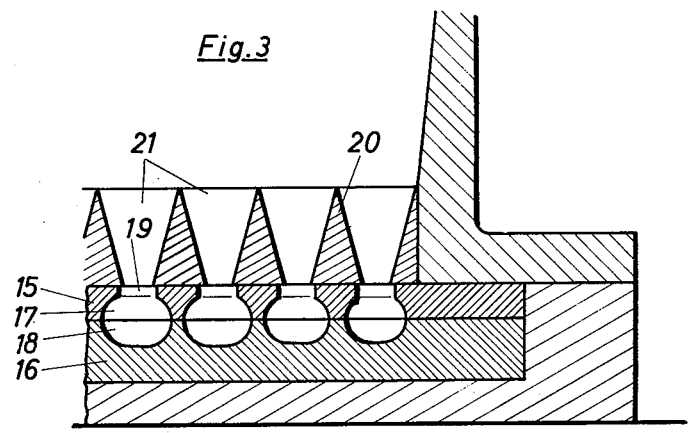
Fig. 3
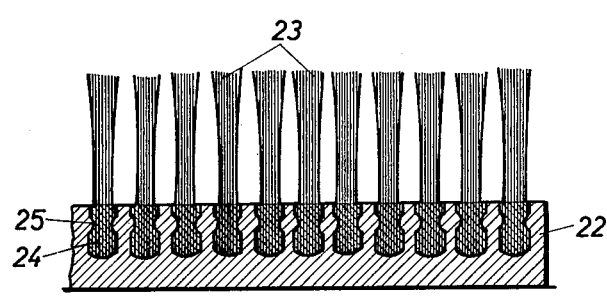
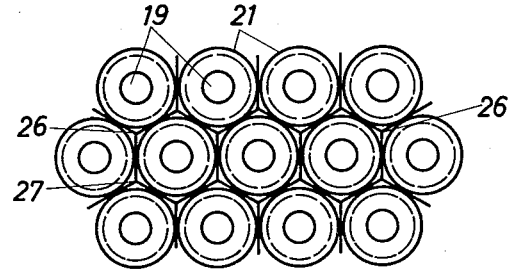
Fig. 4
Fig. 5

June 9, 1964 L. LOCHER ETAL 3,136,582
TOOLS FOR THE MANUFACTURE OF BRUSH WARE
Filed May 12, 1958 5 Sheets-Sheet 5
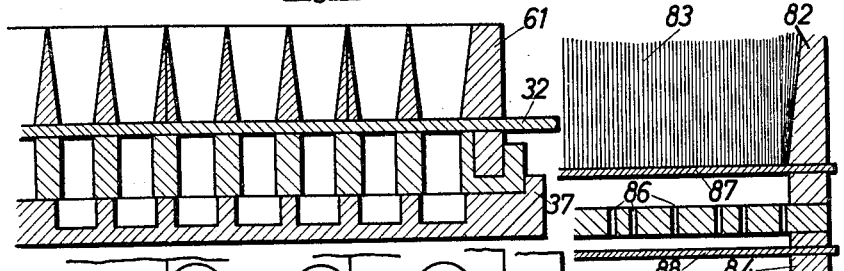
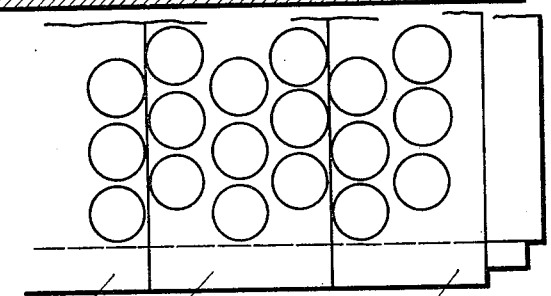
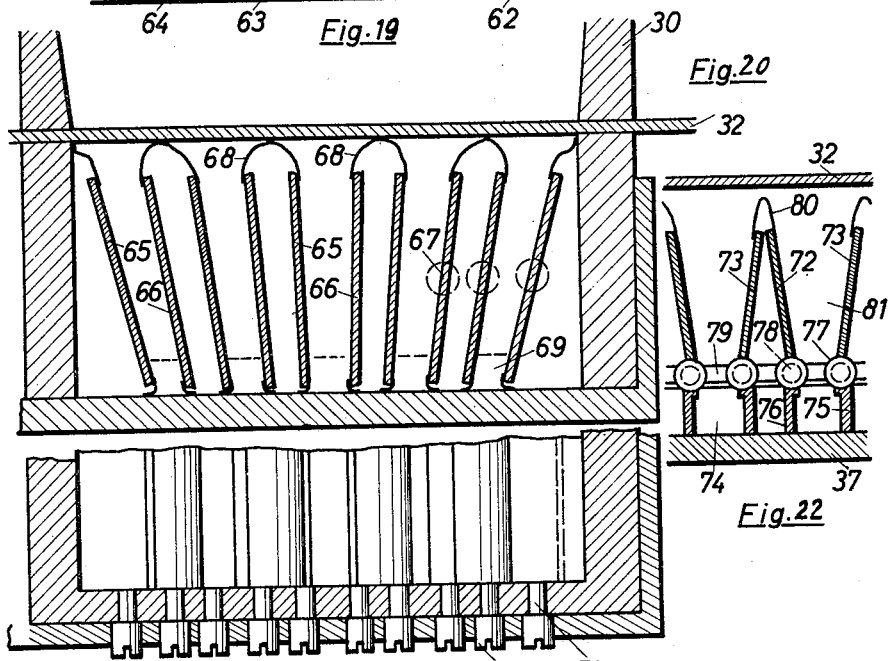
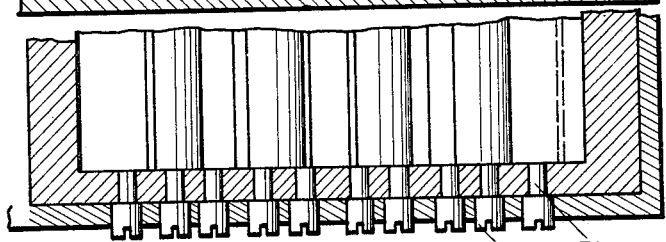

United States Patent Office 3,136,582
Patented June 9, 1964

3,136,582
TOOLS FOR THE MANUFACTURE OF
BRUSH WARE
Lorenz Locher, Munderkingen, Kreis Ehingen, Germany, and Werner Blankschein, Munich, Germany; said Blankschein assignor to said Locher
Filed May 12, 1958, Ser. No. 734,597
Claims priority, application Germany May 11, 1957
23 Claims. (Cl. 300—19)

Our invention relates to tools for producing brushes and brooms of all kinds, and particularly to the manufacture of bristle tufts, the term "bristle" being used in this disclosure for generally denoting any filamentary or elongated members of natural or synthetic origin used for brushes and brooms such as hog bristles, synthetic bristles, sable and other hair, broom corn or wires; and the term "tuft" is meant to include bunches of any shape and size.

In the trend toward greater economy in the production of brush ware, manual production methods have been replaced to a large extent by semi-automatic or full-automatic production. Despite the advantages thus obtainable, the particularities of the various types of brushes or brooms still require a great expenditure in machinery, jigs, working time and labor, since brushes nowadays are being used for an extremely diverse variety of purposes and for an increasing number of new applications in industry and commerce.

It is therefore an object of my invention to devise manufacturing equipment which permits producing a great variety of different types of brushes with the aid of a minimum of tools; and it is also an object to provide an economical device for producing tufts of bristles that can be pre-fabricated in large numbers for the purpose of being subsequently used in the final manufacture of a variety of types of brushes.

In cases where brushes and brooms are to be produced whose body or handle, as well as the bristle material, consists of synthetic plastic, a fully automatic manufacture has been achieved by means of devices in which the bristle material is severed from rolled-up strands and is bonded to the brush body by die-casting or injection-molding. Due to the many steps of operation required, the necessary machines are complicated and spacious, it being particularly difficult to obtain an accurate apportioning of the bristles per tuft and a uniform bristle distribution on the brush body. Furthermore, the material to be used for the molds and tools is relatively expensive due to the high temperatures and pressures employed for die casting. When fabricating natural bristles, it has been difficult to utilize the natural material at full length and to fasten the bristles without performing any additional fabricating steps for grouping them into tufts. Furthermore, embedding of natural bristles into the hot synthetic resin required for die casting requires the use of cooling devices to avoid the danger of the bristle ends being carbonized and loosened.

It is therefore another object of our invention to eliminate the above-mentioned shortcomings and to facilitate the use of synthetics in the manufacture of brush ware.

Still another object of our invention is to simplify the fabrication of natural bristles and vegetable fibres in such a manner as to eliminate the complicated machines and their accessory devices heretofore necessary, while nevertheless securing an economical manufacture of good efficiency that can be performed by unskilled labor if desired.

To achieve these objects and in accordance with a feature of our invention, we provide a molding tool with a forming plate that has one or more molding cavities for the production of the tuft heads. Located vertically above the forming plate is a bristle-apportioning member which has perforations corresponding in number and diameter to the molding cavities of the forming plate. Located vertically above both above-mentioned components, is a bristle container which serves as a dispensing device and has a normally closed bottom member that can be opened to then permit the bristles to drop under their own weight through the perforations of the apportioning member into the mold cavities of the forming plate then filled with liquid casting resin.

By means of such tools, a multiplicity of bristle tufts or bunches can be produced simultaneously, each being provided with a tuft head of cast resin. The bristle tufts may all have equal size or, if desired, may be of different size or thickness; and the tuft heads may be given any particular shape corresponding to the desired application.

According to another feature of the invention, the forming plate and the hardening mass used for embedding the tufts in the mold cavities of the plate are designed to form the ultimate brush body. That is, the forming plate in this case has the shape and dimensions of the body or holder of the ultimate product.

A novel tool according to the invention affords the production of brush ware of all kinds with uniform tufts in virtually any desired large number and within a minimum of manufacturing time. By correspondingly shaping the heads of the bunches and tufts, they can be fastened to corresponding recesses of the brush body of any desired material, simply by having the heads snap into locking engagement with the brush body. This type of fastening also permits making the tufts exchangeable. Furthermore, a tool according to the invention readily permits taking into account the desired contour of the brush body and the ultimately desired tuft arrangement, this being of considerable advantage particularly for the production of industrial and commercial brush ware.

Further advantages are obtained relative to the bristle material to be fabricated. Thus, any suitable bristle material, regardless of whether organic or synthetic, can be fabricated in the commercial length, so that the best possible utilization of the material is secured particularly when using natural bristles or natural fibres. This, too, is of particular advantage in the manufacture of industrial brushes, and in the manufacture of brooms of various kinds for which relatively valuable fibrous materials are used.

Also notable is the simplicity of the tools according to the invention predicated upon the fact that it permits forming the tuft heads from, or embedding the bristles in casting resin, such as phenol casting resin, Araldite, polyester casting resin, and similar embedding materials that require neither compressing nor die-casting or injection molding, thus avoiding the expenditure heretofore necessary for special materials and auxiliary devices, including the expensive die-casting molds and other devices needed for performing the shaping operation.

The pressure-free embedding of the bristle tufts into casting resin also affords making the other components of the device from synthetic material. It is particularly advantageous, according to another feature of the invention, to make the bristle container and the bristle orienting member from transparent non-elastic synthetic material so that the position of the bristles can be observed at any time.

Since, as mentioned, the forming plate may consist of synthetic material, this plate can very readily be multiplied simply by molding and casting without machining expenditure. According to the invention this possibility is utilized by designing the forming plate as a brush body or holder with which the tuft heads are exchangeably connected or locked together. In this manner the complete production of brush ware within a single manufacturing operation is possible with any desired shape and arrangement of the bristle material.

Another main advantage of the novel tool is the fact that, aside from saving labor, the manufacture of the bristle tufts and bunches involves virtually no waste and accurately apportioned quantities of material. Both the contour of the tufts and their arrangement may have any desired shape. For example, it may be circular, rectangular, star-shaped or strip-shaped. The thickness of the tufts and the dimensions of the tuft heads can likewise be adapted to a great extent in accordance with the particular application desired.

According to another feature of our invention, the automatic apportioning of the bristles as well as the shaping of the tuft heads is effected by means of single tool plate with perforations which have an upwardly flaring top portion and have at their bottom an extension parallel to the perforation axis, these perforations serving as apportioning openings, or as tuft-head molding spaces, for simultaneously for both purposes. Such a simplified tool permits producing in a single operation either an entire brush body equipped with bristle tufts or, if desired, a great multiplicity of individual tufts. The tuft heads made with the tool may also be designed to be exchangeable in the brush body, or to secure a firm anchoring in the brush body. The multiple tool just mentioned also affords producing brushes with a ferrule or tuft cap of synthetic material.

The above-mentioned and more specific objects, advantages and features of our invention will be apparent from and will be mentioned in the following description taken in conjunction with the drawings, showing by way of example a number of embodiments of the invention. On the drawing:

FIG. 1 is a longitudinal section through a complete tuft-forming tool, the section being taken along the line A—A in FIG. 2.

FIG. 2 is a top view of a forming plate which shows in its respective four quadrants different designs of the molding cavities.

FIG. 3 is a partial and sectional view of a two-part forming plate.

FIG. 4 illustrates in cross-section a brush body with tufts made according to the invention.

FIG. 5 is a top view of the openings in an apportioning plate that forms part of a device as illustrated in FIGS. 1, 2 and 3.

FIG. 18 is a partial and sectional view of another tool with a multi-part pre-apportioning device.

FIG. 19 is a plan view corresponding to FIG. 18.

FIG. 20 shows in section a tool with adjustable apportioning and molding spaces.

FIG. 21 is a sectional top view of the tool according to FIG. 20.

FIG. 22 illustrates a partial and sectional view of another tool with adjustable apportioning and molding spaces; and FIG. 23 is a partial and cross-sectional view of a tool provided with an intermediate bristle distributor.

Figure 6:
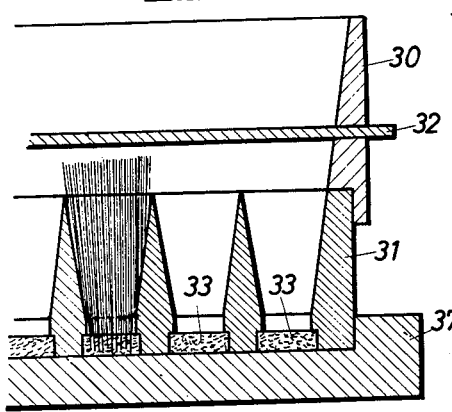
FIGS. 6, 7 and 8 are respectively different partial views, in cross section of molding tools for respectively different tuft-head profiles.

The tool illustrated in FIG. 1 comprises a housing 1 upon which a bristle-aligning member 2 is mounted. Structure 2 carries a container 3 for receiving the bristles 4. Mounted in housing 1 is a displaceable horizontal plate 5 which forms a bottom for container 3 and member 2. The bottom plate 5 can be displaced rapidly to open position, for example by sliding it transversely of the housing 1, in order to suddenly release the bristles from container 3 and member 2. The bottom plate 5 may comprise two horizontally adjacent parts useable in opposite directions away from each other.

The tool is further provided with bristle apportioning means which comprises a guide piece 7 whose bottom is formed by an apportioning plate 8 with openings 9 which form sharp edges 10 at the top. Located beneath plate 8 is a forming plate 11 which has machined mold cavities 12 for receiving the casting resin or plastic material that is to form the heads of the bristle tufts or bunches to be produced.

The apportioning plate 8 and the forming plate 11 are so inserted into the tool that the perforations 9 and the mold cavities 12 register with each other. For accurately guiding or fixing the parts 1, 2, 3, 7, 8, 11, the means generally customary for such purposes may be used, for example guiding columns, dowel pins, or similar devices. The bottom of the housing 1 is formed by a plate 13 which carries an intermediate plate 14 into which the forming plate 11 is inserted.

The left-hand portion and the right-hand portion of FIG. 1 illustrate the tool in respectively different stages of operation, namely at the beginning and at the completion of the tuft formation. The supply of bristles 4 is first inserted into the bristle holders 3 and, by passing through the properly shaped opening of the aligning member 2, is shaped as a whole, in accordance with the contour of the forming plate 11. At first the supply of bristles 4 rests upon the bottom plate 5. After the cavities 12 are filled with heated and molten casting material, for example, phenol casting resin, Araldite, polyester casting resin, or similar synthetic thermoplastic material, the bottom plate 5 is withdrawn into the position shown in the right-hand portion of FIG. 1 so that the bristle supply 4 will drop under its own weight toward the perforations 9 of the apportioning plate 8. During such dropping movement the bristles are somewhat pressed together by means of the guide piece 7 and then pass through the slightly conical, downwardly tapering perforations 9 into the cavities 12 of the forming plate 11. Due to the fact that the perforations 9 form sharp edges at the top of separating partitions 10, all bristles are thus distributed by the apportioning plate 8 into the proper recesses of the forming plate.

After hardening of the casting resin, the forming plate 11 is taken out of the tool and the individual tufts or bunches of bristles can be taken out of the forming plate. The forming plate is preferably made of an elastic synthetic material in order to simplify loosening the tufts by slightly bending the forming plate.

In the top view of the forming plate illustrated in FIG. 2, each quadrant of the illustration shows one of four different possibilities of shaping the cavities 12. The cavities 12 as shown in FIG. 1 and in the left upper portion of FIG. 2 are circular. However, depending upon the desired use, the tufts can be given any other desired shape. For example, the cavities and hence the tufts, may have the shape of strips which may either be straight as shown at 130, or arcuate as shown at 140. A particularly favorable utilization of the available areas is obtained when using a square shape as shown at 15𝟎, this shape being particularly suitable for producing tufts that need not be exchanged in the body or holder of the brush or broom to be produced. Instead of the illustrated square shape, the tufts and hence the cavities may be given some other polygonal shape, for example, that of a regular hexagon (honeycomb shape). The lower right quadrant of FIG. 2 also shows a modified forming plate 11 in the shape of a ring 16, thus exemplifying the fact that the brush bodies used for industrial or commercial purposes and having an arcuate or other particular contour can readily be equipped with tufts made with the aid of a tool according to the invention.

While the cavities 12 in the forming plate 11 according to FIG. 1 are so designed that the diameter of the individual bristle bunches is uniform over the length of the tuft heads, the forming plate illustrated in FIG. 3 is designed for producing tuft heads whose diameter is larger than that of the bristle tuft itself. For this purposes the forming plate comprises an upper portion 15 and a lower portion 16. The mold cavities 17 and 18 machined into these two portions are so shaped that each of them forms about one-half of the bunch head. Mounted above the openings 19 of the upper portion 15 is an apportioning plate 20 whose sharp-edged perforations 21 guide the bristles into the molds 17, 18 in the manner described above. After insertion of the bristles and hardening of the casting resin, the forming plate is taken apart and the finished bristle tufts can then be removed from the molds. This design of the tuft heads is mainly used when it is desired to mount the bristle tufts exchangeably into the bristle-holding body of the brush so that they are constrainedly anchored in that body. In such cases, the brush body is preferably made of an elastic synthetic material, or the bores for receiving the tufts are provided with an elastic insert so that the tufts, when being inserted, will snap into properly locked position.

FIG. 4 illustrates a finished brush body 22 in which the bristle tufts 23, made by means of a tool according to the invention, are firmly inserted in the manner just described. The tuft heads 24 have a ring-shaped groove 25 by means of which the tufts are firmly secured in the brush body 22.

FIG. 5 illustrates the position of the openings 21 (FIG. 3) in the apportioning plate and of the mold cavities 17, 18 in the forming plate. In this embodiment the openings 21 have their sharp top edges in tangential proximity to each other. As a result, virtually all bristles, when dropping through the apportioning plate, will enter into the recesses of the forming plate. The areas 26 remaining between the edges of openings 21 are very small when producing fine bristle tufts so that they prevent no, or only a few, bristles from dropping through the openings. To make certain that all bristles will enter into the recesses, the intermediate areas can be designed to protrude upwardly out of the plane of the apportioning plate and to form sharp ridges which meet each other at a peak point 27.

Figure 7:
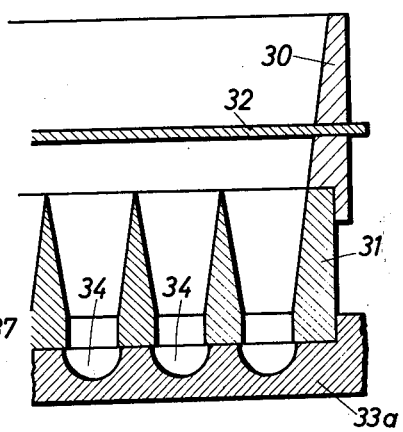
Figures 8, 11:
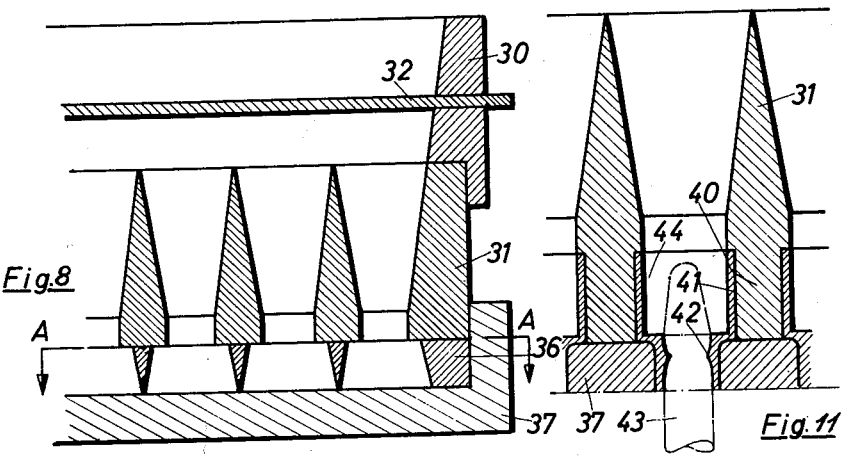
FIG. 11 is a partial and cross-sectional view of a tool for producing brushes with a ferrule of synthetic material.

In the embodiment according to FIGS. 6, 7, 8, the bristle container 30 is seated upon the apportioning device 31, a displaceable intermediate bottom plate 32 being located between container 30 and device 31. The forming plate for the production of the tuft heads in FIG. 6 is a component of the apportioning device 31. The forming plate 37 has recesses 33 for receiving the casting resin that is to form the tuft heads. In this example the tuft heads have cylindrical shape and may be inserted into, or cast together with, a brush body of synthetic resin or other suitable material.

In the tool shown in FIG. 7, a forming plate 33a is provided with semispherical cavities 34 for the formation of tuft heads with a peripheral shoulder portion. As described above, the bristles drop into the cavities 34 in which the casting resin is located. The bristle tufts formed by means of this tool can be exchangeably inserted into correspondingly shaped openings of a brush body. The formation of exchangeable tuft heads, however, is not limited to the use of semispherical mold cavities. For example, the cavities may also be given the shape of a cylinder, with grooves or shoulder ridges that permit exchangeably fastening the tufts in the brush body.

Figure 9:
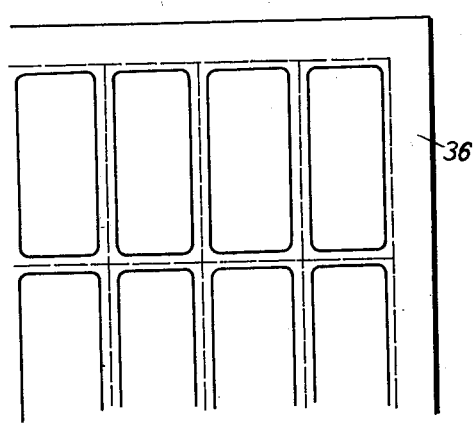
FIG. 9 is a top view along the line A—A in FIG. 8.
Figure 10:
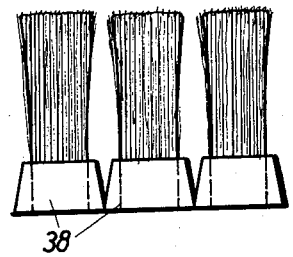
FIG. 10 illustrates a number of bristle bunches made with the tool according to FIGS. 8 and 9.

While the embodiments of FIGS. 6 and 7 provide for tuft heads of circular cross section, the tool illustrated in FIGS. 8 to 10 is designed for the production of strip-shaped tufts or bristle bunches. Located adjacent to the apportioning device 31 is a forming plate 36 (FIGS. 8, 9) which is inserted into a recess of a base plate 37 so that the base plate forms a bottom closure in the same manner as apparent from FIG. 6. The strip-shaped tuft heads 38, as shown in FIG. 10, may have a wedge-shaped profile and are suitable as exchangeable spares for use with industrial or commercial brushes such as those used for cleaning bottles. It will be noted that in the tool according to FIG. 8 the forming plate 36 is designed as an intermediate plate inserted between the base plate 37 and the apportioning device 31. This design principle can be used to advantage for producing respectively different profiles simply by inserting respectively different intermediate plates. The selected intermediate plate is simply placed into the recess of the base plate 37, so that only little time is required for setting up the tool for any particular type of tufts.

Of course, all above-described operations make it necessary or desirable to neutralize those parts of the tool that may come into touch with the casting resin; that is, a suitable coating may be used to prevent the casting resin from permanently adhering to the tool.

For the production of painting brushes, it is desirable to use ferrules or tuft caps of synthetic material which can be produced much more simply and are preferable in use, as compared with the metal caps also used for such purposes. While heretofore an economical way of producing such synthetic-material caps and bonding them together with the bristle holder or brush handle has not been available, the tool shown in FIG. 11 readily permits the simultaneous production of a multiplicity of flat or round painting brushes or brushes of similar type, with synthetic-resin caps or ferrules without requiring for this purpose any operating step in addition to those needed for producing the tufts. For this purpose the tool member 40, which serves for molding the tuft heads and constitutes a component of the apportioning device 31, is provided with cavities that correspond to the cross section of the brush to be produced. The preshaped cap 41 of synthetic material is inserted into the cavity before supplying the casting resin. The cap 41 consists of a somewhat elastic material and has a bulge 42 in its neck portion which serves for subsequently holding and securing the brush handle 43. The handle 43 is likewise inserted before the casting resin is poured into the cavity, so that the handle closes the bottom of the mold cavity. Thereafter, the casting resin is put into the mold space 44, and the bristles are then lowered into the space 44 through the apportioning device 31. The top portion of the handle 43 protruding into the space 44 then becomes simultaneously embedded in the casting-resin bond. After completion of the molding operation and hardening of the resin, the apportioning and forming plate 31 is taken off, and the finished brushes can be lifted out of the base plate 37.

Figure 12:
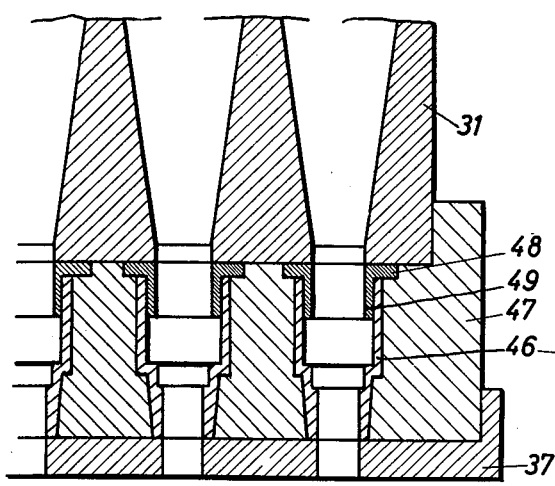
FIG. 12 is a partial and cross-sectional view of another tool for producing brushes.
Figure 13:
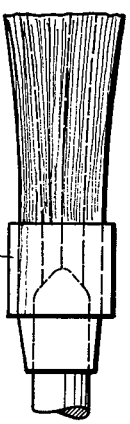
FIG. 13 illustrates a brush made with a tool according to FIG. 7.

The device according to FIG. 11 is particularly suitable for producing brushes of small and medium sizes. With larger brushes, the required quantity of casting resin also increases so that the so-called "rising" of the resin during hardening is augmented. In order to limit the rising of the resin to a permissible limit, the tool shown in FIG. 12 is provided with compensating means. The tool, like the one shown in FIG. 11, serves for embedding the bristles into a synthetic-resin cap or ferrule 46 inserted into the tool. The cap 46 rests upon the base plate 37 and is inserted into a forming member 47. A sleeve-like apportioning body 48 is placed on top of each cap 46 and is provided with a neck 49 which protrudes downwardly into the cap 46. The bore of body 48 registers with a bottom opening of the apportioning device 31. The neck portion 49 limits at its outer periphery the rising of the casting resin, so that such rise is stopped also between the bristles. A brush produced with this tool is illustrated in FIG. 13.

For reliably anchoring the bristles in the synthetic-resin cap, it is preferable to roughen the inner wall of the cap by giving it downwardly directing barbs so that the insertion of the bristles is not impeded whereas a removal of the bristles in the opposite direction is difficult.

Figure 14:
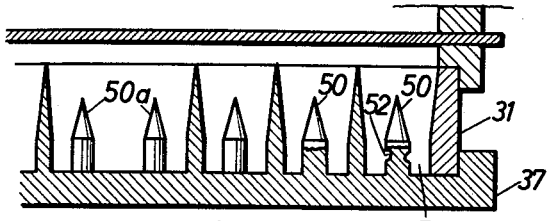
FIG. 14 is a partial and cross-sectional view of a tool provided with core pieces for obtaining a hollow space in the tuft head.
Figure 15:
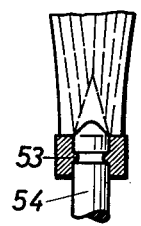
FIG. 15 illustrates a brush as made with a tool according to FIG. 14.

For some types of brushes it is desirable to provide one or more hollow spaces in the head of the tuft or bristle bunch. This can be done in a simple manner, for example by means of a tool design as shown in FIG. 14. According to FIG. 14 the apportioning and forming device 31 is provided with core pieces 50 which occupy the space that is to form a hollow in the tuft head. The embedding of the bristles takes place in the remaining molding space 51 so that the core 50 produces the opening required for the insertion of the brush holder. A firm connection of the holder with the tuft head can be obtained, for example, by means of a peripheral groove 52 (FIG. 14) which produces in the hollow of the tuft head a bulge that will snap into a mating groove 53 of the holder 54 as shown in FIG. 15. With large brushes, several hollow spaces may be desirable. For this purpose, a multiple arrangement of core pieces 50a may be used as is also shown in FIG. 14. The type of tool illustrated in FIG. 14 may also be doubled in such a manner that both sides are designed for the reception of casting resin so that the brush holder is to be inserted from above, in contrast to what has been described before.

Figure 16:
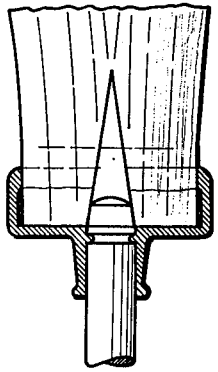
FIG. 16 illustrates a brush of flat shape also made with a tool according to the invention.

In order to join the brush holder 43 by means of the casting resin with the head of the tuft in the manner described above with reference to FIG. 11, the core piece 50 in the tool according to FIG. 14 may also be designed as a component of the brush holder and, with a suitable design of base plate 37, may be inserted as a separate part from below into the forming and apportioning plate 31. This modification produces a brush product as exemplified by FIG. 16.

Figure 17:
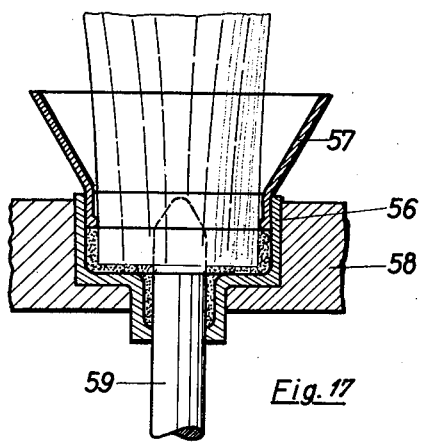
FIG. 17 is an individual tool for the production of flat brushes.

The principle, described with reference to the foregoing embodiments, of embedding the bristles in upwardly open tools without the application of pressure and high temperatures, also affords producing individual tools several of which can be inserted into a common support to be automatically supplied with casting material from a feeder device. Such an individual tool is illustrated by way of example in FIG. 17. It comprises a mold 56 for the synthetic-resin cap into which a casting funnel 57 is inserted, this funnel serving also for aligning the bristles. The parts 56 and 57 are mounted in a support 58 which may readily be made of wood. The brush stick or holder 59, shoved into the mold before supplying the casting resin, closes the bottom of the mold. The funnel 57 has a neck which protrudes into the mold 56 and serves also for limiting the rising of the casting resin.

In the embodiments of the tool so far described, the brush stick or holder is to be inserted from below upwardly into the mold. In certain cases, this procedure may be reversed, so that not only the bristles but also the brush stick are inserted from above. In this case, the casting resin rises along the stick or holder and can be arrested at a given place by providing a recess in the brush holder.

The manufacturing method afforded by the illustrated tool devices can also be used in assembly-line fashion, in which case the respective operating steps must be timed essentially in accordance with the hardening period required for the casting resin.

The multiple tool illustrated in various examples and described above, is extremely versatile with respect to its possibilities of application or use, by virtue of the fact that the arrangement of the individual bristle tufts or bunches can be varied as to number or arrangement within one and the same tool. For this purpose, the tool shown in FIGS. 18 and 19 is equipped with a pre-apportioning member 61 which is composed of different parts 62, 63, 64 applicable individually and separate from each other. These parts, if desired, may be provided with different and separate material-feeder equipment so that it becomes possible to use and embed bristles of different materials, of different hardness, different color, or other different properties, while using the same forming plate or the same brush body. By means of such devices, too, individual areas may be kept vacant, i.e. remain free of bristles.

The tools exemplified by the embodiments shown in FIGS. 20, 21 and 22 are provided with apportioning and forming devices of variable shape. According to FIGS. 20 and 21, the bristle container 30 is provided with a displaceable intermediate bottom plate 32 as described above, and contains in its lower portion a number of transverse partitioning walls 65, 66 that can be turned to a limited extent about respective pivot axes 67 so that the angles of inclination of the partitions relative to each other can be varied.

The apportioning operation is made possible by the fact that the walls 65 and 66 are covered in pairs by flexible webs 68 which adapt themselves to the particular positions of the partitions 65 and 66 and afford the guidance necessary for the bristles dropping into the mold spaces. The described device provides chambers 69 which, during use of the mold, are filled with casting resin up to the level indicated by a broken line. When removing the intermediate bottom plate 32, the bristles drop into the spaces 69 and thus are bonded together to form bristle tufts. With the illustrated example, there can be produced five strip-shaped bristle bunches which have a shape and arrangement suitable for brooms and which can be directly inserted into the bristle-holding body of the broom.

The adjustment of the partitioning walls 65 and 66 is effected by means of pivot pins 70 (FIG. 21) which are slotted so that they can be turned by means of a screw driver. The pivots 70 have shaft portions 71 to which the adjustable partitions are fastened. The adjusted partitions can be fixed in the adjusted position by means of simple nuts in threaded engagement with the other (not illustrated) side of the respective pivot shafts.

The embodiment illustrated in FIG. 22 permits adjusting the partitioning walls 72 and 73 not only with respect to their angle of inclination but also as to their horizontal spacing from each other. For this purpose the molding spaces 74 must also be adjustable, these spaces being formed by and between the walls 75 and 76 and being downwardly closed by the base plate 37. For adjusting the molding spaces 74 in accordance with the mutual spacing of the partitioning walls 72 and 73, the partitions 75 and 76 are connected with the pivot bearings 72 of the partitions 72 and 73. While the walls 72 and 73 are being pivotally displaced about the pivot pins 78 in bearings 77, the bearings 77 move horizontally along transverse grooves 79 and can be fixed in the desired position. The walls 72 and 73 are joined with each other, in pairs, by a flexible web 80 so that when the intermediate bottom plate 32 is pulled out, the proper apportioning of the bristles into the respective spaces 81 is obtained. The front and rear sides of the apportioning spaces in the tools according to FIGS. 20, 21 and 22 are formed by respective plates along which the vertical edges of the partitions 65, 66 or 72, 73 can glide when the latter are being displaced.

The tool illustrated in FIG. 23 permits obtaining any desired distribution of the tufts within a brush body of casting resin. The bristles 83 stacked in the bristle container 82 are guided through an intermediate distributor 84 toward the base plate 85 of casting resin. The intermediate distributor 84 has perforations 86 which are arranged in the desired manner and have the respective diameters of the individual bristle tufts to be formed. Disposed between the bristle container 82 and the intermediate distributor 84 is a displaceable intermediate bottom plate 87. After pulling the plate 87 out of the tool, the bristles first enter into the bores 86. When opening another intermediate bottom plate 88, the bristles enter into the casting space of the base plate 85 where they are embedded into the casting resin. After closing the intermediate bottom plates, the bristle supply 83 can be replenished.

Aside from the above-described possibilities of designing and shaping the tuft or bunch heads for use with brush wares of all kinds, the invention also affords producing brushes or tufts whose free ends have the dome shape often desired in practice, particularly for flat brushes of oval cross section. The dome shape can be obtained by giving the brush stick or holder a semi-spherical shape at its end which enters into the tuft. After the casting resin and the bristles are placed into the molding spaces of the tool, and before the resin is hardened, the spherical end of the holder is pushed into the final position, thus displacing the bristles accordingly and forming the dome-shaped end at the other side of the tuft.

According to a preferred embodiment of the latter type, however, the tool according to the invention is given an upwardly protruding bulge at the bottom of each individual mold cavity so that the bristles, after being lowered into the casting resin, form a tuft which exhibits the desired rounded shape at the other end. This eliminates the necessity of subsequently cutting the tuft to obtain the desired shape.

We claim:

1. A brush-making tool, comprising a forming member having a multiplicity of individual upwardly open mold cavities for receiving plastic casting material, said cavities being of predetermined shape in accordance with respective tuft heads to be produced, a bristle container for accommodating a supply of vertically oriented bristles, apportioning means located on top of said member and having downwardly tapering perforations registering with said respective cavities, the walls of adjacent perforations being joined to form respective apexes for distributing the entire contents of said bristle container among said respective cavities, said mold cavities and said apportioning means together defining tuft head forming means with at least two different diameters for conforming said predetermined shape of a respective tuft head to an interlocking configuration for subsequent locking engagement with a mating brush holder socket, and horizontally displaceable plate means located between said container and said apportioning means and forming the bottom of said container, whereby said plate means when displaced to opening position, permits the bristles to drop through said perforations into said individual mold cavities containing said plastic casting material.

2. A brush-making tool, comprising a forming member having a multiplicity of individual upwardly open mold cavities for receiving plastic casting material, said cavities being of predetermined shape in accordance with respective tuft heads to be produced, a bristle container for accommodating a supply of vertically oriented bristles, apportioning means located on top of said member and disposed vertically beneath said bristle container, said apportioning means having downwardly tapering perforations registering with said respective cavities, the walls of adjacent perforations being joined to form respective apexes for distributing the entire contents of said bristle container among said respective cavities, said mold cavities and said apportioning means together defining tuft head forming means with at least two different diameters for conforming said predetermined shape of a respective tuft head to an interlocking configuration for subsequent locking engagement with a mating brush holder socket, said container having horizontally displaceable bottom-plate means, and a downwardly tapering guide structure located between said bottom plate and said apportioning means and having an inner contour corresponding to that of said member, whereby opening of said bottom-plate means causes the bristles to drop through said guide structure and apportioning means into said individual mold cavities containing said plastic casting material.

3. In a tool according to claim 1, said plate means having a plurality of slider plates horizontally adjacent to each other and displaceable relative to each other between closing and opening positions relative to said container.

4. A tool according to claim 1, said forming member comprising two parts located in face-to-face relation one above the other, said cavities being jointly formed by said two parts and having undercut shape so as to have at their opening a smaller diameter than at the junction of said two parts, whereby the tuft heads formed in said cavities are thicker than the tufts.

5. In a tool according to claim 1, said forming member and said apportioning means consisting of transparent synthetic plastic.

6. In a tool according to claim 2, said bristle container and said guide structure consisting of a rigid transparent plastic.

7. In a tool according to claim 1, said forming member consisting of the tuft-holding brush body of the brush-product to be produced.

8. In a tool according to claim 1, said forming member and said apportioning means forming together a single integral tool plate having a multiplicity of vertical bores, each bore having a downwardly tapering upper portion which forms one of said apportioning perforations, and each bore having a substantially cylindrical lower portion which forms one of said respective individual mold cavities for containing said plastic casting material.

9. A tool according to claim 8, comprising a base plate removably disposed below said tool plate in face-to-face contact therewith so as to close said tool-plate bores during tuft-forming operation.

10. In a tool according to claim 8 for joining ferrule caps with the respective heads of the tufts being produced, said lower portions of each bore in said tool plate having undercut shape so as to be wider at its bottom than at the top and forming thereby an annular shoulder, said wide bottom part being adapted to receive the cap and said shoulder having a radial width corresponding to the radial thickness of the cap, whereby the cap, when inserted into said lower portion of said bore forms a continuation of the upper portion of said bore.

11. A tool according to claim 8, comprising a base plate removably disposed below said tool plate in face-to-face contact therewith, said base plate having openings coaxially registering with said respective bores and having a smaller diameter than the adjacent bottom part of said bores, said openings being adapted to be closed by respective brush handles to be stuck through said openings into said caps.

12. A brush making tool unit, comprising a forming member having an upwardly open mold cavity for receiving a castable plastic material, said cavity having the shape of an individual tuft head to be produced, a bristle apportioning member removably mounted on top of said forming member and having a downwardly tapering opening registering with said cavity for passing bristles from above into the cavity.

13. A brush making tool unit, comprising a forming member having an upwardly open mold cavity for receiving a castable plastic material, said cavity having the shape of an individual tuft head to be produced, a ring-shaped funnel member tapering downwardly and removably mounted on top of said forming member in coaxial registry with said cavity for guiding bristles from above into said cavity, said forming member having a central and downwardly extending neck portion of smaller inner diameter than said cavity and merging with said cavity, and said neck portion having a central hole in its bottom for passing a brush holder from below into said cavity.

14. A brush making tool unit, comprising a forming member having an upwardly open mold cavity for receiving a castable plastic material, said cavity having the shape of an individual tuft head to be produced, a bristle apportioning member removably mounted on top of said forming member and having a downwardly tapering opening registering with said cavity for passing bristles from above into the cavity, said apportioning member having an annular shoulder projecting toward the cavity axis for limiting the rising of the plastic material.

15. A tool according to claim 12, comprising a core piece on the cavity bottom of said forming member for forming a hollow space in the tuft head to be produced.

16. A tool according to claim 1, comprising a base plate disposed beneath said forming member in face-to-face contact therewith, said forming plate having throughbores which together with said base plate form said respective mold cavities.

17. A tool according to claim 1, comprising at least one intermediate plate disposed between said cavities and said plate means and displaceable horizontally for selectively covering and uncovering a desired number of said cavities.

18. A tool according to claim 1, comprising a horizontal pre-apportioning plate disposed between said plate means and said apportioning means, said pre-apportioning plate covering a plurality of selectively applicable parts having respectively different groups of apportioning holes for producing respectively different patterns of tuft arrangements.

19. A tool according to claim 1, said apportioning means comprising a number of horizontally spaced partitions extending downwardly and having adjustable angles of inclination relative to each other.

20. A tool according to claim 1, said apportioning means comprising a number of horizontally spaced partitions extending downwardly and having adjustable angles of inclination relative to each other, said partitions being arranged in pairs of which each forms a downwardly tapering interspace, and flexible web means covering the respective spaces between each two adjacent ones of said pairs, each of said web means being attached to the respective tops of two of said partitions.

21. A tool according to claim 1, said apportioning means comprising a number of horizontally spaced partitions extending downwardly and having adjustable angles of inclination relative to each other, said partitions being arranged in pairs of which each forms a downwardly tapering interspace; and said forming member having a number of substantially vertical partitioning pieces arranged in pairs, each pair forming one of said cavities in registry with one of said tapering interspaces respectively, said partitioning pieces being horizontally displaceable, and means for adjusting said angles of inclination together with the horizontal displacement of said partitioning pieces.

22. A tool according to claim 1, comprising a horizontal pre-apportioning plate exchangeably disposed between said plate means and said apportioning means, said pre-apportioning plate having a selected arrangement of perforations for selectively producing respectively different tuft arrangements, and intermediate bottom plate means horizontally extending between said pre-apportioning plate and said apportioning means and being displaceable from closed to open position.

23. A method of making brushes comprising the steps of filling a multiplicity of individual mold cavities with liquid plastic casting material at atmospheric pressure, apportioning bristles into tufts, said mold cavities defining a predetermined shape for forming tuft heads having an interlocking configuration for subsequent locking engagement with a mating brush holder socket, inserting said tufts into respective ones of said mold cavities to form durable uniform heads corresponding to said shape, solidifying the plastic casting material in said mold cavities at ambient temperature to form heads on said tufts, and subsequently removably locking the resulting heads of the individual tufts into a mating brush holder socket.

References Cited in the file of this patent
UNITED STATES PATENTS

| | | |
|---|---|---|
| 570,604 | Morrison | Nov. 3, 1896 |
| 622,768 | Hellwig | Apr. 11, 1899 |
| 798,380 | Alexander | Aug. 29, 1905 |
| 1,413,211 | Albright | Apr. 18, 1922 |
| 2,488,873 | Maynard | Nov. 25, 1949 |
| 2,643,158 | Baldanza | June 23, 1953 |
| 2,655,409 | Baldanza | Oct. 13, 1953 |